March 8, 1960 E. F. COSTELLO 2,927,482
SPEED CONTROL COUPLING
Filed Aug. 16, 1957 2 Sheets-Sheet 1

Edmund F. Costello
INVENTOR.

BY *Thomas A. O'Brien*
*and Harvey B. Jacobson*
Attorneys

March 8, 1960     E. F. COSTELLO     2,927,482
SPEED CONTROL COUPLING
Filed Aug. 16, 1957     2 Sheets-Sheet 2
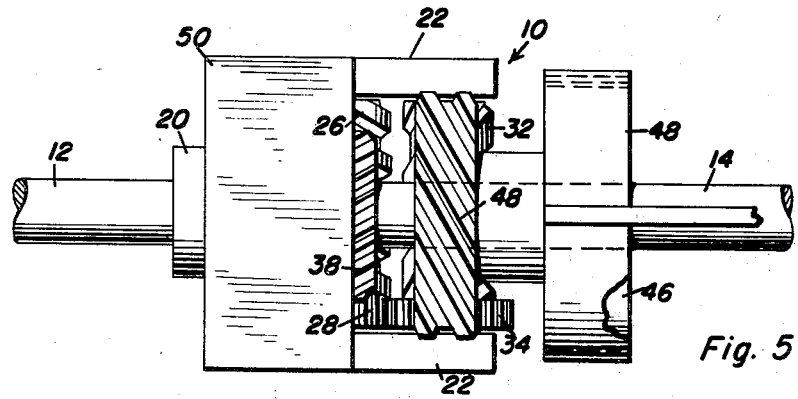
Fig. 5
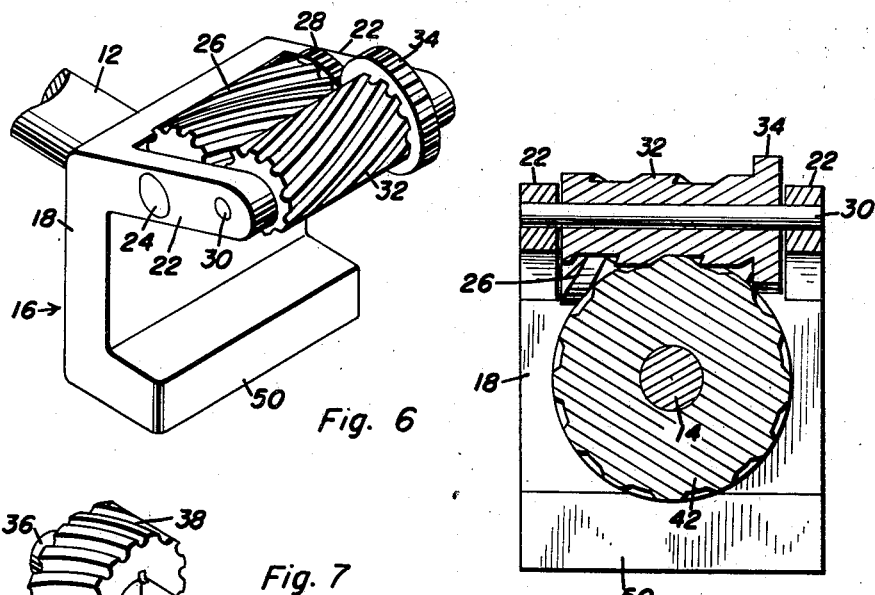
Fig. 6
Fig. 4
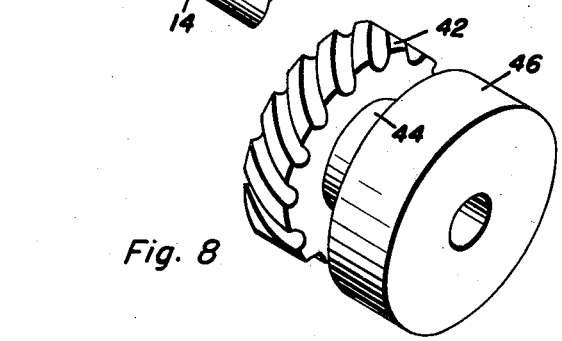
Fig. 7
Fig. 8
Edmund F. Costello
INVENTOR.
BY United States Patent Office 2,927,482
Patented Mar. 8, 1960

2,927,482

SPEED CONTROL COUPLING

Edmund F. Costello, Newton Falls, Ohio

Application August 16, 1957, Serial No. 678,470

5 Claims. (Cl. 74—781)

This invention relates in general to new and useful improvements in drive mechanisms, and more specifically to an improved speed control coupling.

The primary object of this invention is to provide a speed control coupling which is so designed whereby drive ratios between zero and one to one may be readily attained with a very simple coupling mechanism.

Another object of this invention is to provide improved speed coupling which includes a reduction gearing controllable by means of a brake mechanism, the reduction gearing being of such a design whereby the braking action required is a minimum one.

Another object of this invention is to provide a speed coupling for obtaining various drive ratios as desired, the speed coupling being of an extremely simple construction in the form of a readily obtainable component whereby the manufacture thereof is economically feasible.

A further object of this invention is to provide an improved speed coupling for providing a variable ratio drive between a drive shaft and a driven shaft, the coupling utilizing at least one worm gear assembly which is of the non-reversible type and including a brake for controlling the rotation of a gear, the association of the worm gear assembly and the brake being such whereby a minimum braking action is required to restrain rotation of the worm gear and thus control the operation of the speed control assembly.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is a transverse sectional view similar to Figure 3 taken substantially upon the plane indicated by the section line 4—4 of Figure 2 and shows the details of a second worm gear assembly;

Figure 5 is a bottom plan view of the speed control assembly;

Figure 6 is a perspective view of the carrier and the gears carried thereby;

Figure 7 is a perspective view of one end of the driven shaft and shows the driven gear carried thereby; and Figure 8 is a perspective view of a control gear and the plate drum connected thereto.

Figure 1:
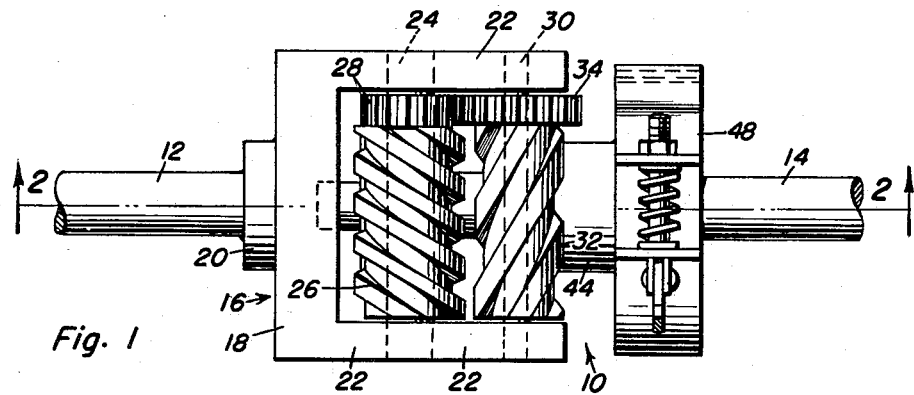
Figure 1 is a top plan view of the control mechanism which is the subject of this invention and shows the general arrangement of gears carried by a carrier thereof.

Referring now to the drawings in detail, it will be seen that there is illustrated the speed control coupling which is the subject of this invention, the speed control coupling being referred to in general by the reference numeral 10. The speed control coupling 10 includes a driveshaft 12 and a driven shaft 14, the driven shaft 14 being axially aligned with the drive shaft 12.

Figure 2:
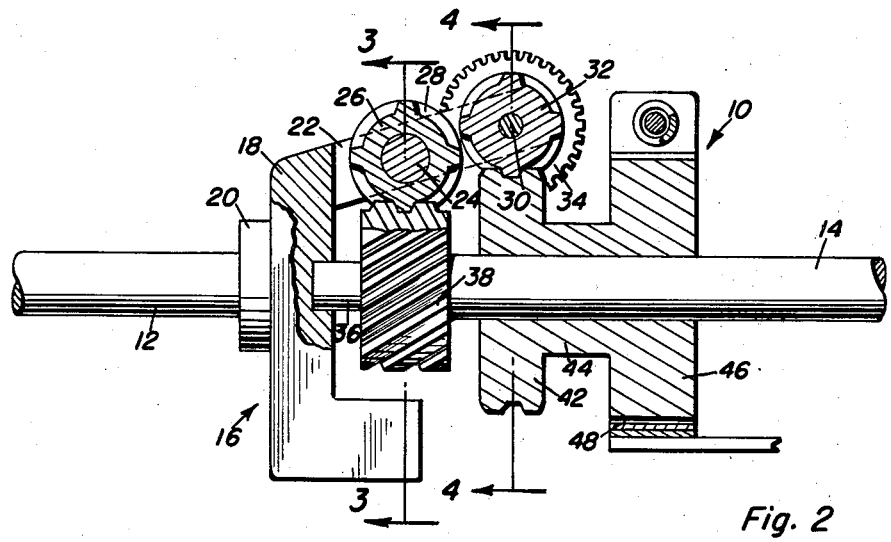
Figure 2 is a longitudinal sectional view taken substantially upon a plane indicated by the section line 2—2 of Figure 1 and shows further the various arrangements of the gears of the speed control mechanism.

Carried by the driveshaft 12 is a carrier which is referred to in general by the reference numeral 16. The carrier 16 includes a base 18 which is disposed in a plane normal to the axis of the driveshaft 12. The left side of the base 18, as is viewed in Figure 2, is provided with a hub 20 receiving the right end of the drive shaft 12. The carrier 16 is rigidly secured to the driveshaft 12 to the hub 20 for rotation with the drive shaft 12.

Projecting from one edge of the base 18 is a pair of spaced parallel arms 22. The arms 22 are disposed at a slight angle to the axis of the driveshaft 12 and projections of the arms 22 intersect the driveshaft 12 to the left of the carrier 16, as is best shown in Figure 2.

Extending between the arms 22 and mounted therein is a first shaft 24. Rotatably journaled on the first shaft 24 is a first gear 26. Formed integral with the first gear 26 is a third gear 28. It is to be noted that the shaft 24 is disposed adjacent the base 18.

Also extending between the arms 22 and supported thereby is a second shaft 30. The second shaft 30 has rotatably journaled thereon a second gear 32. Formed integral with the second gear 32 is a fourth gear 34. It is to be noted that the gears 28 and 34 are meshed with each other so that when the gear 26 rotates, the gear 32 also rotates.

Figure 3:
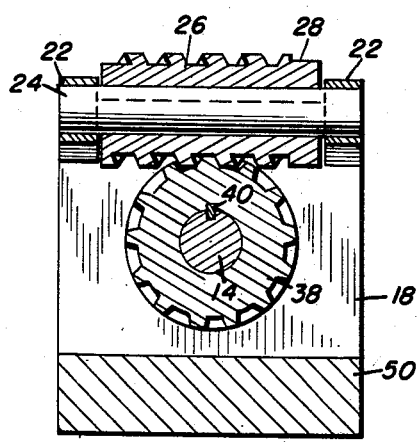
Figure 3 is a transverse sectional view taken substantially upon a plane indicated by the section line 3—3 of Figure 2 and shows the details of a first worm gear assembly.

The driven shaft 14 has a reduced end portion 36 which is rotatably journaled within the base 18 and the carrier 16. Mounted on the driven shaft 14 adjacent the base 18 is a fifth gear 38. The fifth gear 38 is keyed to the reduced portion 36 by means of a key 40, as is best shown in Figure 3. It is to be noted that the fifth gear 38 is meshed with the first gear 26.

Rotatably journaled on the driven shaft 14 in alignment with the second gear 32 is a sixth gear 42. The sixth gear 42 is meshed with the second gear 32, as is best shown in Figure 5.

In order that the rotation of the sixth gear 42 may be controlled, there is provided a hub 44 which connects to the sixth gear 42 a brake drum 46. A suitable brake mechanism 48 is provided for engaging the brake drum 46 and controlling the rotation of the sixth gear 42 through the drum 46.

It is to be noted that the axes of the shafts 24 and 30 are parallel to each other. Also, the axes of the shafts 24 and 30 are disposed normal to the axes of the driveshaft 12 and the driven shaft 14 with the shafts 24 and 30 being disposed in offset overlying relation with respect to the shaft 14.

Inasmuch as the carrier 16 may rotate at a high speed, it is desired to balance the carrier. Accordingly, secured to the base 18 at the opposite edge thereof from the arms 22 is a counterbalance weight 50. The counterbalance weight 50 projects generally parallel to the shaft 14 and is of a sufficient weight to counterbalance the arms 22, the shafts 24 and 30, and the gears 26, 28, 32 and 34.

It is to be noted that the first gear 26 and the fifth gear 38 form a worm gear assembly. The first gear 26 is in the form of a worm and the fifth gear 38 is in the form of a worm wheel. While the tooth construction of the gears 26 and 38 may be any desired, it is to be understood that the gears 26 and 38 should be of the reversible drive type.

It is also to be noted that the second gear 32 and the sixth gear 42 form a second worm gear assembly. The gear 32 is in the form of a worm and the gear 32 is in the form of a worm wheel. However, the tooth design of the gears 32 and 42 is such that the worm gear assembly is non-reversible in that the gear 32 cannot drive the gear 42.

From the foregoing description of the various gears, it will be seen that the gear 42 is a control gear. Thus by controlling the rotation of the gear 42, the driving of the driven shaft 14 from the drive shaft 12 may be controlled. Should the brake device 48 be so operated so as to prevent rotation of the control gear 42 through the holding of the brake drum 46, when the carrier 16 rotates with the driveshaft 12, the second gear 32 will rotate about the sixth gear 42 thus causing a driving of the second gear 32. The rotation of the second gear 32 will result in the rotation of the fourth gear 34. Inasmuch as the third gear 28 is meshed with the fourth gear 34, the third gear 28 will be rotated likewise. Since the first gear 26 is formed integral with the third gear 28, rotation of the third gear 28 will result in rotation of the first gear 26. The rotation of the first gear 26 will have a tendency to drive the fifth gear 38 so as to rotate the driven shaft 14. However, the drive ratio between the fifth gear 38 and the second gear 32 through the third gear 28 and the fourth gear 34 is the same as the drive ratio between the sixth gear 42 and the second gear 32. As a result, the rotation of the carrier 16 will cause movement of the first gear 26 about the fifth gear 38 and rotation of the first gear 26 with respect to the shaft 24 the same as that which it is driven from the second gear 32. As a result, the first gear 26 will merely turn about the fifth gear 38 and the driven shaft 14 will remain stationary.

Because of the particular drive ratio of the various gears, it will be seen that the speed of rotation of the driven shaft 14 will actually be the same as that of the gear 42. First should the gear 42 be free to rotate, there will be a tendency for the assembly to lock up and rotate as a unit with the driven shaft 14 rotating at the same speed as drive shaft 12. While controlling the rotation of the sixth gear 42, which gear is the control gear, through controlling the rotation of the brake drum 46 by means of the brake device 48, the relative ratio between the driveshaft 12 and the driven shaft 14 may be readily controlled.

At this time, it is pointed out that by making the coupling between the gear 32 and the gear 42 a non-reversible one so that the gear 32 cannot actually drive the gear 42, but can only effect rotation of the gear 42 by its movement about the gear 42, very little braking effort is required to restrain the gear 42 against rotation. Therefore, the brake device 48 may be of a simple construction. Since only a light restraining force is required on the brake drum 46, it will be seen that the slippage which occurs when the drive ratio between the driveshaft 12 and the driven shaft 14 is between zero and one to one will be relatively light.

From the foregoing, it will be readily apparent that the speed control coupling 10 is of a very simple construction and is a very desirable one because of the relatively great control permitted. Other advantages of the speed control coupling will become apparent from further study and experimentation.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A speed control coupling comprising a driveshaft, a driven shaft aligned with said driveshaft, a carrier secured to said driveshaft, first and second transverse shafts carried by said carrier in offset relation to said driven shaft, first and second gears mounted on said transverse shafts, third and fourth gears connected to said first and second gears for rotation therewith, said third and fourth gears being in meshed engagement, a fifth gear secured to said driven shaft for rotation therewith, said fifth gear being meshed with said first gear, a sixth gear rotatably journalled on said driven shaft, said sixth gear being meshed with said second gear, and brake means connected to said sixth gear for controlling the rotation thereof, said second and sixth gears forming a non-reversible worm gear assembly, said first and fifth gears forming a reversible worm gear assembly, the drive ratio of said fifth gear to said first gear multiplied by the drive ratio of said third gear to said fourth gear being the same as the drive ratio of said sixth gear to said second gear.

2. A speed control coupling comprising a driveshaft, a driven shaft aligned with said driveshaft, a carrier, said carrier including a base secured to said driveshaft with said base being disposed substantially normal to said driveshaft, a pair of spaced parallel arms projecting from one edge of said base and parallel in generally overlapping relation to said driven shaft, first and second transverse shafts extending between and supported by said carrier arms in offset relation to said driven shaft, first and second gears mounted on said transverse shaft, third and fourth gears connected to said first and second gears for rotation therewith, said third and fourth gears being in meshed engagement, a fifth gear secured to said driven shaft for rotation therewith, said fifth gear being meshed with said first gear, a sixth gear rotatably journalled on said driven shaft, said sixth gear being meshed with said second gear, and brake means connected to said sixth gear for controlling the rotation thereof.

3. A speed control coupling comprising a driveshaft, a driven shaft aligned with said driveshaft, a carrier, said carrier including a base secured to said driveshaft with said base being disposed substantially normal to said driveshaft, a pair of spaced parallel arms projecting from one edge of said base and parallel in generally overlapping relation to said driven shaft, first and second transverse shafts extending between and supported by said carrier arms in offset relation to said driven shaft, first and second gears mounted on said transverse shaft, third and fourth gears connected to said first and second gears for rotation therewith, said third and fourth gears being in meshed engagement, a fifth gear secured to said driven shaft for rotation therewith, said fifth gear being meshed with said first gear, a sixth gear rotatably journalled on said driven shaft, said sixth gear being meshed with said second gear, said carrier arms diverging from said driven shaft whereby said sixth gear may be of a larger diameter than said first gear to facilitate the rotational mounting of said sixth gear on said driven shaft, and brake means connected to said sixth gear for controlling rotation thereof.

4. A speed control coupling comprising a driveshaft, a driven shaft aligned with said driveshaft, a carrier, said carrier including a base secured to said driveshaft with said base being disposed substantially normal to said driveshaft, a pair of spaced parallel arms projecting from one edge of said base and parallel in generally overlapping relation to said driven shaft, first and second transverse shafts extending between and supported by said carrier arms in offset relation to said driven shaft, first and second gears mounted on said transverse shaft, third and fourth gears connected to said first and second gears for rotation therewith, said third and fourth gears being in meshed engagement, a fifth gear secured to said driven shaft for rotation therewith, said fifth gear being meshed with said first gear, a sixth gear rotatably journalled on said driven shaft, said sixth gear being meshed with said second gear, said carrier arms diverging from said driven shaft whereby said sixth gear may be of a larger diameter than said first gear to facilitate the rotational mounting of said sixth gear on said driven shaft, the drive ratio of said fifth gear to said first gear multiplied by the drive ratio of said third gear to said fourth gear being the same as the drive ratio of said sixth to said second gear, and brake means connected to said sixth gear for controlling the rotation thereof.

5. A speed control coupling comprising a driveshaft, a driven shaft aligned with said driveshaft, a carrier, said carrier including a base secured to said driveshaft with said base being disposed substantially normal to said driveshaft, a pair of spaced parallel arms projecting from one edge of said base and parallel in generally overlapping relation to said driven shaft, first and second transverse shafts extending between and supported by said carrier arms in offset relation to said driven shaft, first and second gears mounted on said transverse shaft, third and fourth gears connected to said first and second gears for rotation and therewith, said third and fourth gears being in meshed engagement, a fifth gear secured to said driven shaft for rotation therewith, said fifth gear being meshed with said first gear, a sixth gear rotatably journalled on said driven shaft, said sixth gear being meshed with said second gear, said carrier arms diverging from said driven shaft whereby said sixth gear may be of a larger diameter than said first gear to facilitate the rotational mounting of said sixth gear on said driven shaft, the drive ratio of said fifth gear to said first gear multiplied by the drive ratio of said third gear to said fourth gear being the same as the drive ratio of said sixth gear to said second gear, said second and sixth gears forming a non-reversible worm gear assembly, said first and fifth gears forming a reversible worm gear assembly, and brake means connected to said sixth gear for controlling the rotation thereof.

References Cited in the file of this patent

UNITED STATES PATENTS

| | | |
|---|---|---|
| 2,159,983 | Colby | May 30, 1939 |
| 2,378,082 | Hood | June 12, 1945 |
| 2,494,466 | Wolf | Jan. 10, 1950 |
| 2,559,916 | Gleasman | July 10, 1951 |

FOREIGN PATENTS

| | | |
|---|---|---|
| 618,933 | Germany | Sept. 19, 1935 |
| 620,732 | Germany | Oct. 25, 1935 |